United States Patent [19]
Horn

[11] 3,779,362
[45] Dec. 18, 1973

[54] GLASS CONTAINER HANDLING APPARATUS
[75] Inventor: Larry L. Horn, Winchester, Ind.
[73] Assignee: Maul Bros. Inc., Millville, N.J.
[22] Filed: Oct. 13, 1971
[21] Appl. No.: 188,929

[52] U.S. Cl. .............................................. 198/24
[51] Int. Cl. ........................................... B65g 47/00
[58] Field of Search ...................................... 193/24

[56] References Cited
UNITED STATES PATENTS
3,595,365  7/1971  Faure ................................. 198/24
3,400,802  9/1968  Rowe ................................. 198/24
1,118,152  11/1914  Rowe ................................. 198/24
3,559,537  2/1971  Faure ................................. 198/24

Primary Examiner—Evon C. Blunk
Assistant Examiner—James W. Miller
Attorney—Arthur H. Seidel et al.

[57] ABSTRACT

A 90° pusher for handling glass containers, convertible from righthand to lefthand and vice versa, is self-contained and includes a housing supported by a bracket and rotatable about a center post. Rotation of the housing is effected by means of a dual surface cam track and linkage actuated thereby. The pusher has an automatic reset feature if a jam occurs.

10 Claims, 6 Drawing Figures

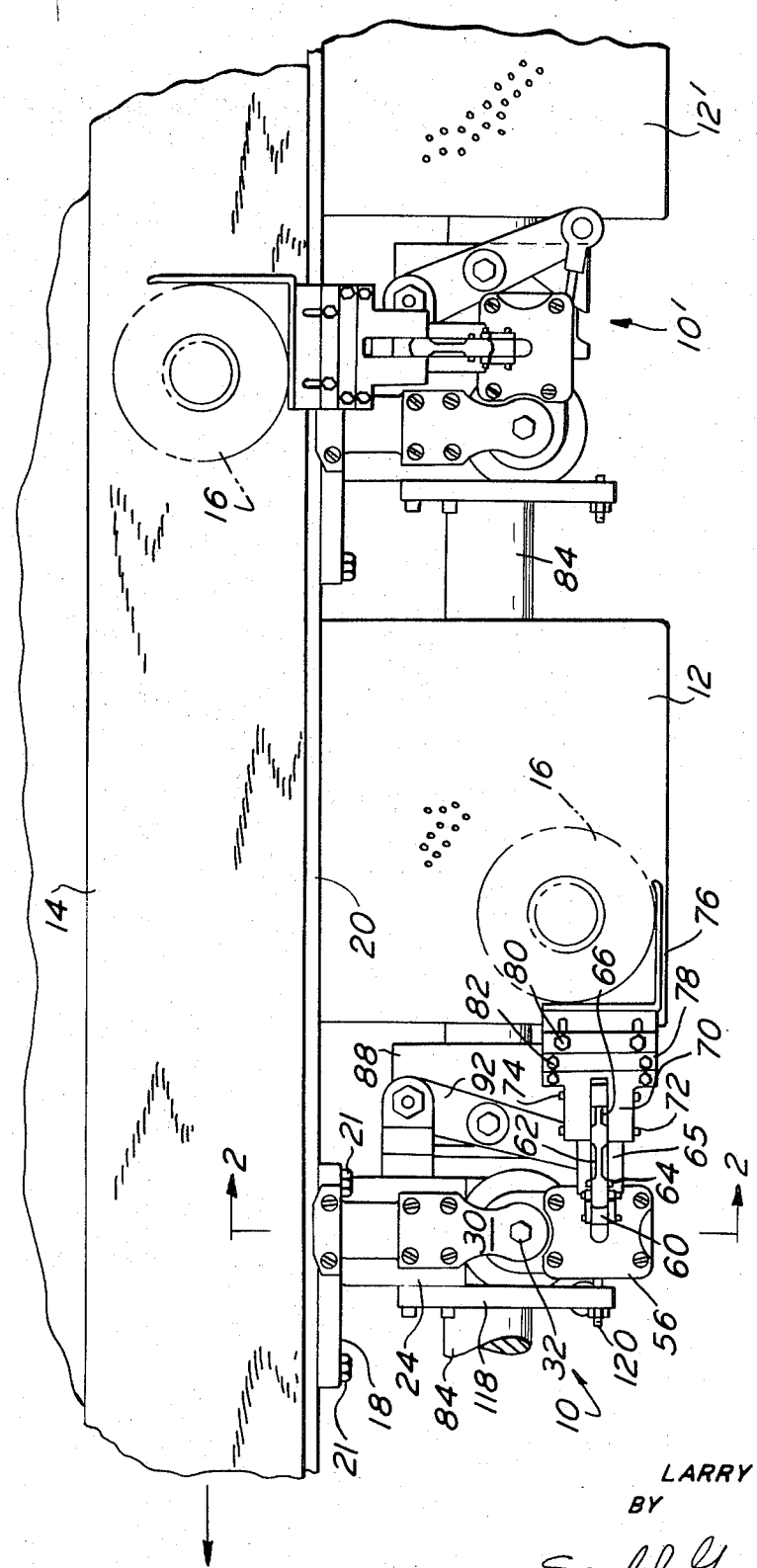

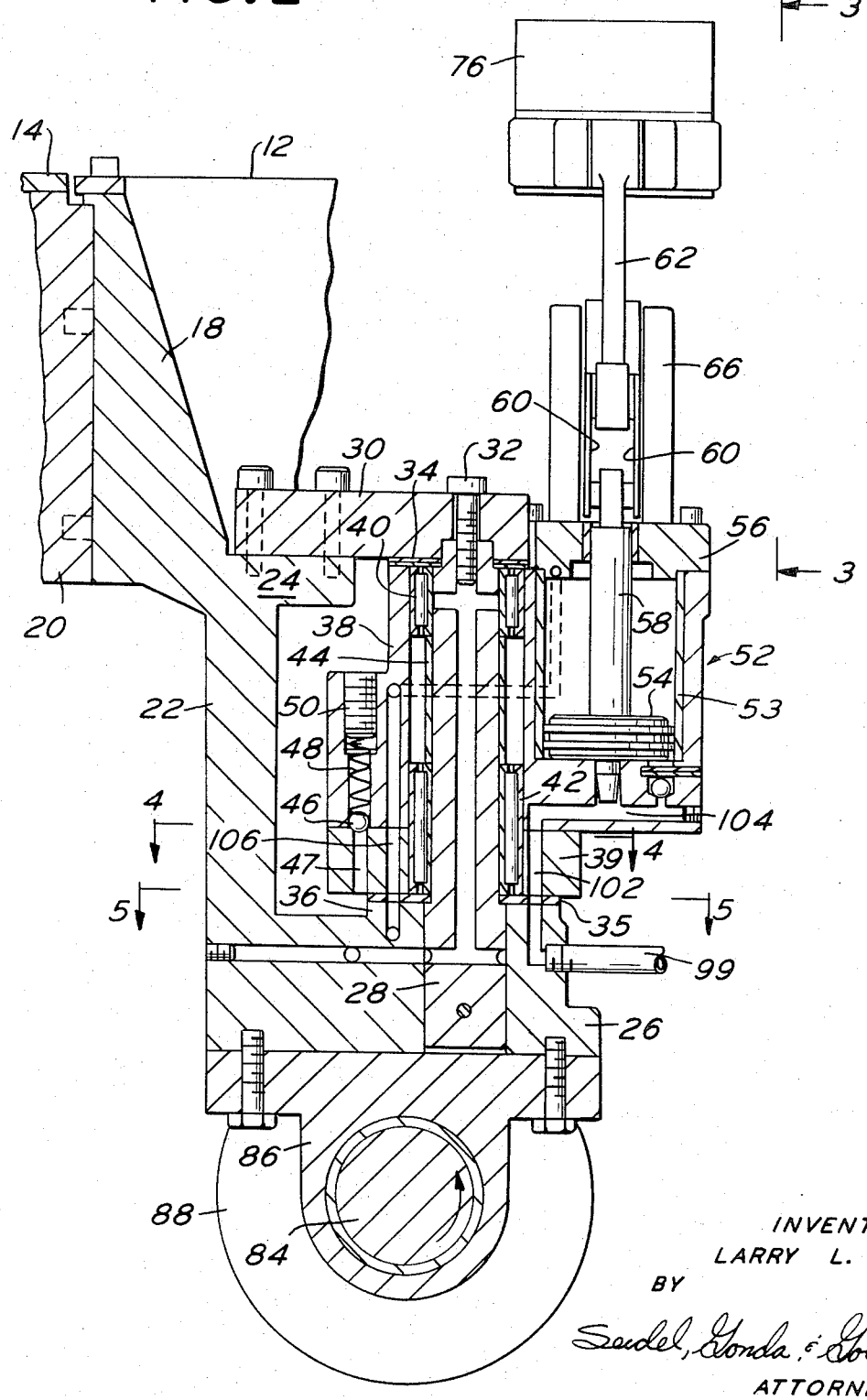

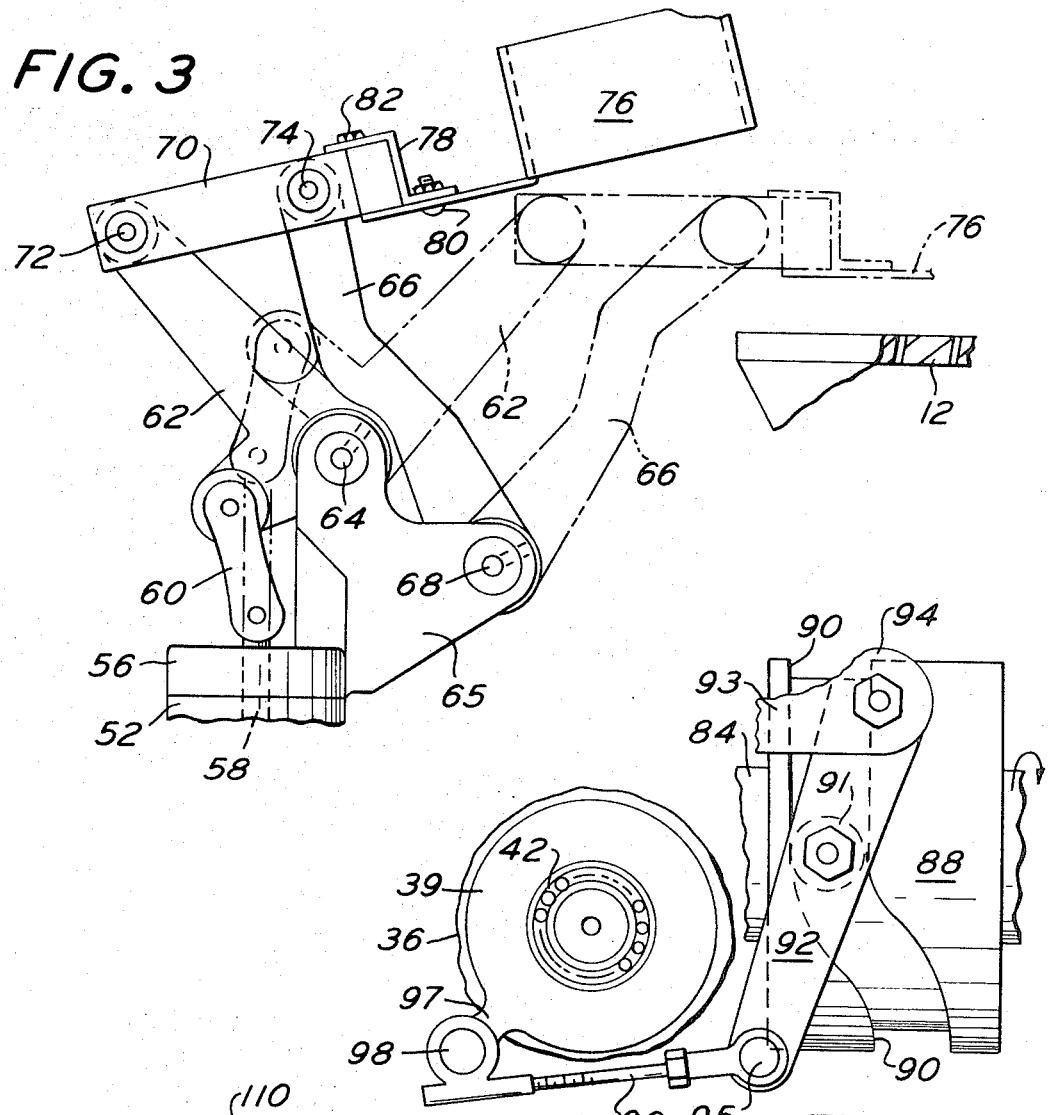
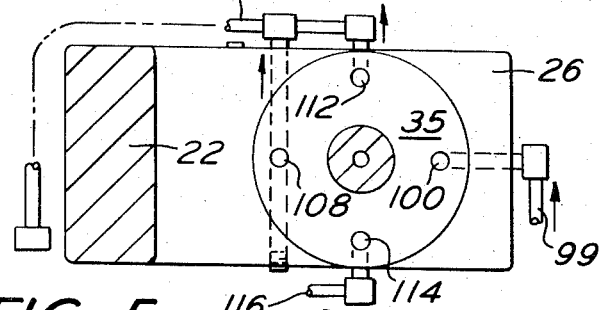

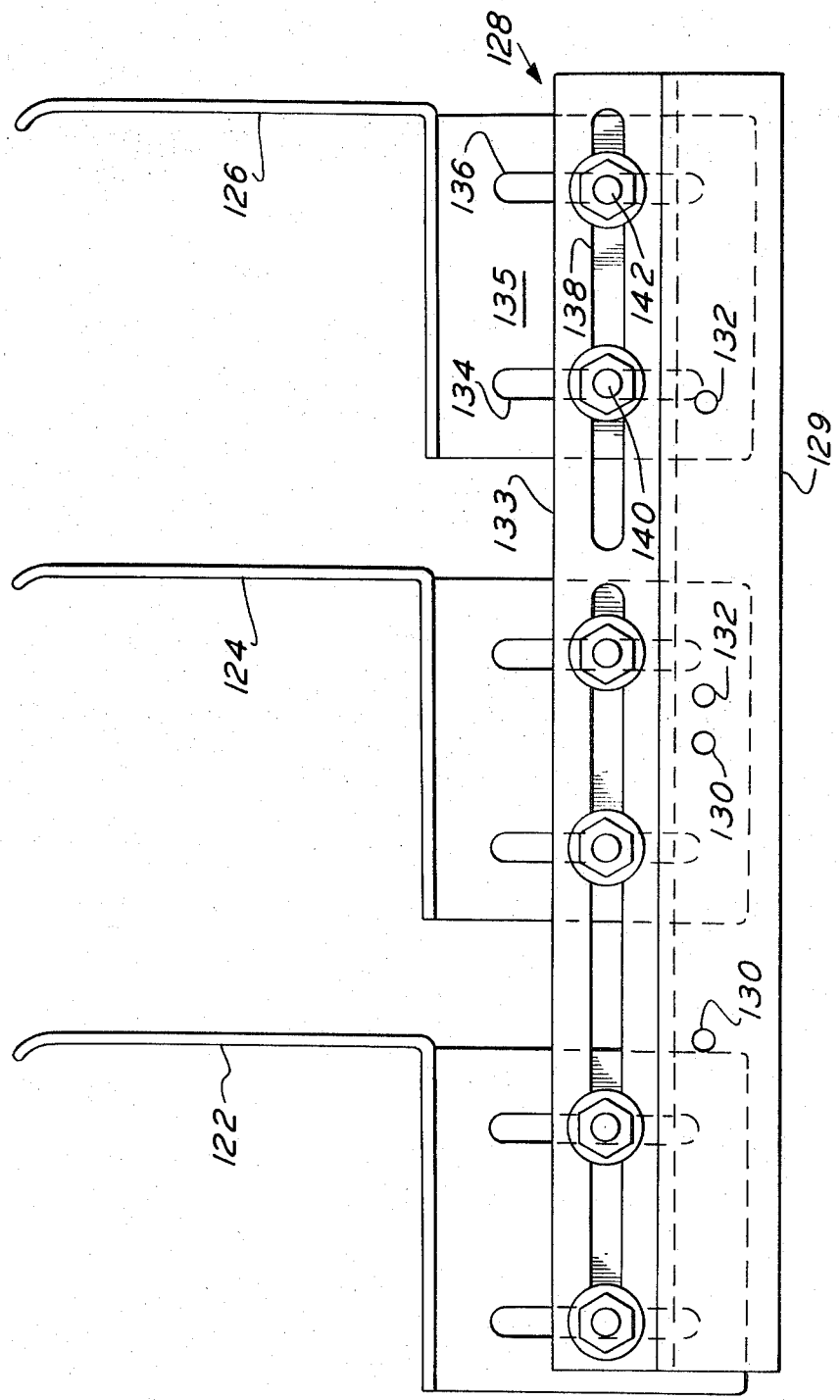

GLASS CONTAINER HANDLING APPARATUS

DISCLOSURE

The glass container handling apparatus of the present invention is often referred to as a 90° pusher for transferring newly formed glass containers from a dead plate onto a conveyor. While on the dead plate, the glass containers are subjected to a cooling effect by way of air passing upwardly through the perforated top surface of the dead plate. Typical patents disclosing a 90° pusher are U. S. Pat. Nos. 3,249,200 and 3,510,288.

The apparatus of the present invention is particularly adapted in a manner to overcome disadvantages of the prior art. The apparatus of the present invention is a self-contained unit which may be installed or removed as a unit. Maintenance on the apparatus of the present invention is minimized by using a device structurally interrelated in a manner which avoids the use of springs for maintaining a cam follower in contact with a cam face, eliminates the use of chain and sprocket drive mechanisms, and other features of the prior art which require substantial maintenance and thereby create substantial down-time for the apparatus.

The apparatus of the present invention includes a pusher plate which physically engages glass containers and transfers them from the dead plate to the conveyor. The pusher plate is supported for extension and retraction by means of a housing. The housing is supported by a flange on a mounting bracket for oscillation about the longitudinal axis of a vertical center post. The pusher plate and its motor are supported by a first section of the housing. Means for oscillating the housing as a unit is connected to a second section of the housing.

The housing sections are coupled together for rotation as a unit. In the event of a jam, the housing sections are uncoupled so that the first housing section and the pusher plate will cease rotating. The first housing section and the pusher plate will move during the return stroke back to their initial position, and engage a limit stop, due to the friction between the housing sections.

The oscillation of the housing is effected by means of an actuator linkage extending between the housing and a cam follower disposed in a double face cam track. The use of a double face cam track minimizes wear on the cam follower, minimizes vibration, and eliminates the requirement of a drag brake on the cam shaft. In this manner, a more positive drive is provided for the oscillation of the housing with fewer components than proposed heretofore and while using components which are less prone to require maintenance.

The apparatus of the present invention is capable of being converted from lefthand to righthand operation and vice versa. Conversion can be attained in twenty minutes without requiring any extra parts. All components of the apparatus of the present invention except for the pusher plate and its actuating linkage are below the plane of the dead plate and conveyor so as to minimize the heat to which the components are subjected.

The apparatus of the present invention is adapted to be installed on a wide variety of I.S. machines including a standard type E machine, Maul type E 5-inch GJ, Maul 6-inch center GJ, Maul 4-inch center TG, Maul 4¼-inch TG, etc.

The apparatus of the present invention is more compact than those provided heretofore whereby the furthermost rotating surface is only 3¾ inches from the axis of rotation. The axis of rotation is substantially equidistant from the centerline of the dead plate and conveyor. In the event that maintenance is required on the housing, it is easily removed without affecting removal of the support bracket.

It is an object of the present invention to provide novel glass container handling apparatus which is compact, easy to install, and easy to maintain.

It is another object of the present invention to provide glass container handling apparatus for transferring glassware from a dead plate to a conveyor in a manner which minimizes the need for maintenance.

It is another object of the present invention to provide a 90° pusher wherein oscillation is effected by means of a cam follower disposed in a double face cam track.

It is another object of the present invention to provide a 90° pusher having an automatic reset feature which resets the mechanism if a jam occurs.

It is another object of the present invention to provide a 90° pusher which may be convertible from lefthand to righthand and vice versa in a short period of time without using any extra parts.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is a partial plan view of apparatus in accordance with the present invention.

FIG. 2 is a sectional view taken along the line 2—2 in FIG. 1.

FIG. 3 is a side elevation view taken along the line 3—3 in FIG. 2.

FIG. 4 is a sectional view taken along the line 4—4 in FIG. 2.

"FIG. 5 is a sectional view taken along the line 5—5 in FIG. 2".

FIG. 6 is a top plan view of the pusher plate assembly adapted to be utilized when more than one glassware container is being transferred from the dead plate to the conveyor.

Referring to the drawing in detail, wherein like numerals indicate like elements, there is shown a pair of adjacent 90° pushers in accordance with the present invention designated generally as 10 and 10'. The 90° pushers shown in the drawing are set up for righthand delivery. Hence, to the right of the pusher 10, there is provided a dead plate 12. To the right of the pusher 10', there is provided a dead plate 12'. The number of pushers and dead plates will vary on conventional machinery from four to eight in number. A conveyor 14 extends alongside each of the pushers and dead plates to convey the newly formed glassware to annealing equipment.

Each of the 90° pushers and its relationship with its associated dead plate and the conveyor 14 are identical. Hence, only pusher 10 will be described in detail.

The pusher 10 is supported from a conveyor beam 20, below the conveyor 14, by means of a bracket 18. In operative embodiments of this invention, four bolts 20 are utilized to removably attach the bracket 18 to the conveyor beam and thereby install or permit complete removal of the pusher 10. Thus, the pusher 10 may be rapidly installed or removed.

The bracket 18 includes a depending portion 22 having an upper short flange 24 and a lower long flange 26. Each of the flanges 24 and 26 projects away from the conveyor belt 14. A vertically disposed center post 28 is fixedly secured in a bore in flange 26 at a location so that its longitudinal axis is substantially equidistant from the adjacent edge of the dead plate 12 and conveyor 14. This feature contributes to the ability of the pusher 10 to be orientated for lefthand operation or righthand operation as desired. Post 28 is provided with suitable bores, one of which is aligned with a bore in the flange 26 to facilitate lubricating bearings and other components surrounding the post 28.

A top plate 30 is removably bolted to the flange 24. The lower surface of plate 30 is recessed so as to receive the stationary center post 28. A bolt 32 extends through a bore in the plate 30 and is threadedly secured to the upper end of the post 28.

A shim and a flat spring 34 are provided below and in engagement with the lower surface of plate 30. The shim and spring surround the post 28 and overlie a housing comprised of sections 38 and 39. The spring 34 biases the housing sections toward boss 36 which is a part of flange 26 and surrounds the post 28.

A combination wear plate and valve plate 35 is provided on top of the boss 36 and below the housing section 39. Spaced bearings 40 and 42 are provided between the post 28 and the I.D. of the housing 39. A spacer sleeve 44 maintains the bearings 42 and 40 spaced from one another. Thus, the housing is mounted for rotation about the longitudinal axis of post 28.

The only interconnection between the housing sections 38 and 39 is the hardened steel ball 46 which enters a bore 47 in the section 39. A spring 48 biases the ball into a position wherein it constitutes a link causing the housing sections 38 and 39 to rotate as a unit. The spring pressure may be adjusted by means of the set screw 50. In the event of an obstruction which interferes with the free rotation of section 38, ball 46 will be cammed upwardly against the spring 48 so that the housing section 39 may rotate independently of section 38. This will be described in greater detail hereinafter.

The housing section 38 includes a cylinder 52 having a replaceable liner 53. Within the liner 53, there is provided a piston 54 connected to a piston rod 58. The piston rod 58 extends upwardly through a cylinder head 56.

The upper end of piston rod 58, above the elevation of head 56, is pivotably connected to one end of a link 60. The other end of link 60 is pivotably connected to the short leg of a bell crank link 62. One end of the long leg of link 62 is pivotably connected by pin 64 to extension 65 on head 56. Another link 66, longer than link 62, has one end pivotably connected to extension 65 by means of pin 68. The other end of each of the links 62 and 66 is pivotably connected to a connector 70 at spaced points thereon by means of pins 72 and 74, respectively.

The connector 70 is generally T-shaped with the long leg thereof pivotably connected to the links 62 and 66. The transverse leg of the connector 70 is adjustably connected to a pusher plate 76. As shown more clearly in FIG. 1, the pusher plate 76 is generally L-shaped with one leg being adjustably connected to the transverse leg of the connector 70 by means of bracket 78. Bracket 78 is adjustably connected to plate 76 by means of a bolt or screw 80 which extends through slot 83 on pusher plate 76 and the bracket 78 shown more clearly in FIGS. 1 and 3. Bracket 78 is removably connected to the transverse arm on the T-shaped connector 70.

A driven cam shaft 84 extends below each of the 90° pushers parallel to the conveyor 14. The cam shaft is conveniently attached to the bracket on each of the 90° pushers by means of a pillow block 86 with a suitable bearing therebetween. The pillow block 86, see FIG. 2, is removably connected to the bottom surface of the flange 26.

A cam 88 is attached to the cam shaft 84 at spaced points therealong adjacent each of the 90° pushers. See FIG. 4. Cam 88 is provided with a double face cam track 90. Cam 88 is preferably made from mating halves bolted together. A cam follower 91 is disposed within the track 90 and rotatably attached to an arm 92 intermediate the ends of the arm 92.

One end of arm 92 is pivotably connected by pin 94 to a bracket 93 bolted to the depending portion 22 of bracket 18 at an elevation approximately the same as the elevation of housing section 39. The other end of arm 92 is pivotably connected by pin 95 to one end of a rod 96. The length of rod 96 is adjustable since it includes two members threaded together. The other end of rod 96 is pivotably connected by pin 98 to a boss 97 on the housing section 39. As cam 88 rotates, cam follower 91, arm 92, rod 96 and boss 97 cause the housing section 39 to oscillate through an arc of 90°. In an operative embodiment of the invention, the cam track 90 has a throw of approximately 1½ inches spread over an arc of 210° with the remaining circumferential arc of 150° being a dwell period when the pusher arm 76 is over the dead plate 12.

A means is provided to cause the motor to extend and retract the pusher plate 76 in a predetermined manner at the ends of the 90° oscillation of the housing. Referring to FIGS. 1 and 5, a conduit 99 supplies pressurized air from a compressed air supply. The pressurized air is communicated upwardly through a passage in the flange 26, through bore 100 in the wear plate 35, through aligned passage 102 in the housing section 39 and through passage 104 in the cylinder 52 to the bottom portion of the chamber to cause the piston 54 to move upwardly. As piston 54 moves upwardly, the pusher plate 76 moves from the solid-line position shown in FIG. 3 to the phantom position shown in FIG. 3.

When pressurized air is being introduced in the bottom of the cylinder chamber as described in the next preceding paragraph, at the same time the chamber above the piston 54 is vented to atmosphere by way of passages in the housing section 38, passage 106 in housing section 39, bore 108 in the wear plate 35, and conduit 110. As shown in FIG. 5, the bores 100 and 108 are diametrically opposite one another.

As the housing rotates 90° as a result of the rotation of the cam 88, at the end of the 90° transfer stroke, bore 100 will be aligned with bore 112 in the wear plate 35. Bore 112 will then permit the pressurized air below the piston to be vented to atmosphere via conduit 110. At the same time, the space above the piston 54 will be in communication with pressurized air conduit 116 by way of bore 114 in the wear plate 35 and passages in the housing including passage 106. Hence, at the end of the transfer stroke of the housing, the piston 54 will be caused to move downwardly to the position shown in FIG. 2. As piston 54 moves downwardly, the pusher plate 76 is retracted from a horizontal phantom position as shown in FIG. 3 to the solid line position shown in Figure .

In order that the housing section 38 will automatically reset to its proper position with the pusher plate over the dead plate, a limit stop 118 is provided as shown in FIG. 1. Limit stop 118 is supported by the bracket 118 at an elevation corresponding to the elevation of the cylinder head 56. The end of limit stop 118 adjacent the head 56 is provided with an adjustable screw 120.

When more than one bottle or container is to be transferred from the dead plate onto the conveyor during oscillation of the housing, a pusher plate may be constructed so as to have a plurality of pockets as shown in FIG. 6. In FIG. 6, three containers may be simultaneously transferred by the L-shaped plates 122, 124, and 126. Each of these plates is adjustably connected to a mounting bracket 128 which, like bracket 78, is Z-shaped in section.

The Z-shaped bracket 128 has a top leg 129 provided with a series of holes 130 to be used for lefthand operation and a series of holes 132 to be used for righthand operation. Each of these holes is adapted to facilitate mounting the bracket 128 on the transverse portion of the actuator 70. Each of the plates 122, 124, and 126 is adjustably supported by bracket 128 in the same manner. Hence, only the mounting for plate 126 will be described in detail.

Plate 126 has a flat portion or flange 135 provided with a pair of spaced parallel slots 134, 136. A lower leg 133 of bracket 128 has a slot 138 which is perpendicular to the slots 134, 136. Bolts 140, 142 join the flange 135 to the lower leg 133 with each bolt extending through the zone where the slots 134, 136 and 138 overlap. In this manner, the plate pocket may be moved toward and away from bracket 128 as well as along the longitudinal axis of bracket 128 to accommodate different size containers as well as any misalignment associated with a particular take-out mechanism on the I.S. machine.

The operation of the apparatus is as follows.

Each individual section of the I.S. machine includes take-out tongs or other equivalent devices which deliver one or more newly formed glass containers onto the dead plates. It is desirable to permit the containers to remain on the dead plates for a short period of time where they will be exposed to cooling air from the dead plates. The perforations in the top surface of the dead plates and the supply of cooling air thereto is conventional.

As soon as the housing completes its return stroke, the head 56 will engage the screw 120 on the limit stop 118. At this point, passage 102 is aligned with bore 100 and pressurized air is introduced below the piston 54 to cause the pusher plate 76 to be projected or extended to the position shown in FIG. 1. The cam follower 91 then oscillates the arm 92 to rotate the housing sections 38 and 39 through an arc of 90° so that the glass container is transferred onto the middle portion of the conveyor 14 as shown at the righthand end of FIG. 1. During this transfer stroke, the lower edge of pusher plate 76 lies at an elevation wherein it is approximately ½ inch above a plane containing the dead plate 12 and the conveyor 14.

At the completion of the transfer stroke, the housing is returned to its initial position by way of the oscillation of arm 92 effected by means of the cam follower 91 and the cam track 90. At the end of the transfer stroke, pressurized air is introduced into the chamber above the piston 54 and the space below the piston 54 is vented to atmosphere. Hence, as the housing begins its return stroke, the pusher plate 76 is retracted and elevated from the phantom position shown in FIG. 3 to the solid line position shown in FIG. 3. As the housing completes its return stroke, the pusher plate 76 is automatically extended again due to realignment of bore 100 and passage 102. Due to the dwell period on the cam, there is a slight delay before the next transfer stroke is commenced.

If there is a jam or some other obstruction which prevents the smooth and uninhibited transfer of glass containers, housing section 38 will immediately stop while housing section 39 continues to rotate. As this occurs, the ball 46 is cammed upwardly so as to break the link between the housing sections. Housing section 38 will automatically reset on the next return stroke of section 39.

The return of the housing section 38 to its initial starting position wherein it contacts the adjustable screw or bolt on the limit stop 118, is effected by the friction between the mating surfaces between the housing sections amplified by the spring bias 48 on the ball 46 as well as the spring 34 which tends to maintain the housing sections in intimate contact. As soon as the housing sections 38 and 39 are properly aligned at the initial starting point for a transfer stroke, the ball 46 will again seat in the bore 47. If the obstruction or jam is still subsisting, the sequence will repeat itself until both housing sections may move through a complete transfer stroke.

If it is desired to repair or replace the 90° pusher, it is only necessary to remove the bolts extending between bracket 18 and the beam 20 as well as the bolts between the pillow block 86 and the bracket 18. Thereafter, the entire 90° pusher may be raised vertically and replaced or repaired.

Alternatively, if it is desired to merely replace the housing and the pusher plate, it is only necessary to remove the bolts interconnecting the top plate 30 and the bracket 18 as well as the bolt 32. Thereafter, the housing sections may be rotated 90° from the position shown in FIG. 2 and raised vertically. A replacement housing may be substituted and the apparatus back in operation within a few minutes.

If it is desired to convert a 90° pusher from righthand operation to lefthand operation, this may be accomplished in about twenty minutes as follows. The bolts interconnecting the cylinder head 56 to the cylinder 52 are removed, the head rotated 180°, and the bolts are then replaced. Pin 98 is removed. Bracket 93 is removed and reattached to the opposite side of the bracket 18. The top plate 30 is removed, the housing is removed and then replaced after housing section 39 has been flipped over to the opposite side. Limit stop 118 is removed and attached to the opposite side of the apparatus. The cam 88 will have been shifted to a position wherein it may receive the cam follower 91. This completes the conversion.

Since the center post 28 is substantially equidistant from the adjacent dead plates and the conveyor 14, the 90° pusher will have been converted to lefthand operation. More importantly, the 90° pusher is capable of being installed initially for lefthand or righthand operation depending upon the set-up of the I.S. machine without requiring any additional parts and with minimum labor. Thus, a single 90° pusher can be manufactured with the versatility of being installed for either lefthand or righthand operation.

Since the friction brake on the cam shaft 84 has been eliminated, there is less vibration and less horsepower is needed. The drag brake was needed to resist the intermediate torques effected by springs and chain sprocket drives on prior art devices. Thus, the 90° pusher of the present invention is more compact, and more reliable than those proposed heretofore.

The present invention may be embodied in other specific forms without departing from the spirit or essential attributes thereof, and accordingly, reference should be made to the appended claims, rather than to the foregoing specification as indicating the scope of the invention.

I claim:

1. Glass container handling apparatus comprising a 90° pusher for transferring newly formed glassware from a dead plate onto a conveyor, said 90° pusher including a mounting bracket having a lower flange, a vertical post supported by the flange, a top plate connected to the bracket generally parallel to said flange, said top plate being coupled to the upper end of the post, a housing surrounding said post and rotatably supported by said flange, a motor and a pusher plate supported by said housing for rotation therewith, said pusher plate being above said motor and connected thereto by linkage means, actuator means including a cam shaft having a double face cam track for causing said housing to oscillate through an arc of about 90°, said actuator means including a cam follower in said track and an arm pivoted at one end to said bracket and pivoted at its other end to said housing, said cam follower being supported by said arm intermediate its ends, means associated with said motor for causing said motor to extend said pusher plate so that it will push glassware from a position on a dead plate onto a conveyor as said housing rotates and for retracting the pusher plate after each transfer stroke, said housing including first and second sections, said motor being supported by said first section, said actuator means being connected to said second section, and means releasably coupling said sections together for rotation as a unit and for interrupting the coupling of said sections if a jam occurs.

2. Apparatus in accordance with claim 1 including a limit stop on said bracket for engaging a portion of said first housing section to properly position the first housing section for the commencement of a new transfer stroke, and means biasing said first housing section downwardly into frictional contact with said second housing section.

3. Apparatus in accordance with claim 1 including a spring-biased member on said first section, means defining a recess on said second section for receiving said spring-biased member to effect the coupling between said sections in a manner so that said member may be cammed upwardly in the event of a jam to permit the second section to rotate independently of the first section.

4. Apparatus in accordance with claim 1 wherein said linkage means interconnecting said motor and said pusher plate includes a bracket, a plurality of said pusher plates each defining a pocket for engaging newly formed glassware to be transferred to the conveyor, and means for connecting each pusher plate to the last-mentioned bracket for adjustment in a direction along the last-mentioned bracket as well as toward and away from the last-mentioned bracket.

5. Apparatus in accordance with claim 1 wherein said post is between said motor and the portion of said bracket adapted to be mounted on a conveyor support frame.

6. Glass container handling apparatus comprising a 90° pusher for transferring newly formed glassware through an arc of 90° from a dead plate onto a conveyor, said 90° pusher including a mounting bracket having a lower flange, a vertical post supported by the flange, a top plate connected to the bracket generally parallel to said flange, said top plate being coupled to the upper end of the post, a housing surrounding said post and rotatably supported by said flange, a fluid-actuated motor and a pusher plate supported by said housing for movement therewith, said pusher plate being above said motor and connected thereto by linkage means, actuator means coupled to said housing for causing said housing to cyclically oscillate through an arc of about 90°, said actuator means including a cam follower and a cam as well as an arm pivoted at one end to a stationary support, said arm being pivoted at its other end to said housing, said cam follower being supported by said arm intermediate its ends, means associated with said motor for causing said motor to extend said pusher plate to a position so that it will push glassware from a position on a dead plate onto a conveyor as said housing rotates and for retracting the pusher plate after each transfer stroke, said last-mentioned means including a wear plate supported by said lower flange, said housing being mounted on top of said wear plate, said housing having spaced passages communicating with said motor for introducing motive fluid to said motor, said wear plate having bores aligned with said passages in said housing at the ends of the oscillatory stroke of said housing, and conduit means for communicating one wear plate bore to a source of pressure and for venting an oppositely disposed bore in said wear plate.

7. Apparatus in accordance with claim 6 wherein said housing iancludes first and second sections, said motor being supported by said first section, said actuator means being connected to said second section, and means including a spring-biased member releasably coupled said sections together for rotation as a unit and for interrupting the coupling of said sections if a jam occurs.

8. Apparatus in accordance with claim 6 wherein said cam is provided with a peripheral circumferentially disposed double-face track which receives said cam follower.

9. Glass container handling apparatus comprising a 90° pusher for transferring newly formed glassware from a dead plate onto a conveyor, said 90° pusher including a mounting bracket having a lower flange, a vertical post supported by the flange, a top plate connected to the bracket generally parallel to said flange, said top plate being coupled to the upper end of the post, a housing surrounding said post and rotatably supported by said flange, a motor and a pusher plate supported by said housing for rotation therewith, said pusher plate being above said motor and connected thereto by linkage means, actuator means including a cam shaft having a double face cam track for causing said housing to oscillate through an arc of about 90°, said actuator means including a cam follower in said track and an arm pivoted at one end to said bracket and pivoted at its other end to said housing, said cam follower being supported by said arm intermediate its ends, means associated with said motor for causing said motor to extend said pusher plate so that it will push glassware from a position on a dead plate onto a conveyor as said housing rotates and for retracting the pusher plate after each transfer stroke, a pair of dead plates alongside a conveyor, and said 90° pusher being mounted between said dead plates with the distance from the axis of said post to said conveyor being substantially equal to the distance from said axis to said dead plates.

10. Glass container handling apparatus comprising a 90° pusher for transferring newly formed glassware from a dead plate onto a conveyor, said 90° pusher including a mounting bracket having a lower flange, a vertical post supported by the flange, a top plate connected to the bracket generally parallel to said flange, said top plate being coupled to the upper end of the post, a housing surrounding said post and rotatably supported by said flange, a motor and a pusher plate supported by said housing for rotation therewith, said pusher plate being above said motor and connected thereto by linkage means, actuator means including a cam shaft having a double face cam track for causing said housing to oscillate through an arc of about 90°, said actuator means including a cam follower in said track and an arm pivoted at one end to said bracket and pivoted at its other end to said housing, said cam follower being supported by said arm intermediate its ends, means associated with said motor for causing said motor to extend said pusher plate so that it will push glassware from a position on a dead plate onto a conveyor as said housing rotates and for retracting the pusher plate after each transfer stroke, said housing having spaced passages communicating with said motor for introducing motive fluid to said motor, said last-mentioned means including a stationary wear plate interposed between said lower flange and said housing, and said wear plate having bores aligned with said passages in said housing at the ends of the oscillatory stroke of said housing.

* * * * *